United States Patent
Kim et al.

(10) Patent No.: US 11,386,240 B2
(45) Date of Patent: Jul. 12, 2022

(54) DATA TRANSMISSION SYSTEM AND METHOD IN PHYSICAL NETWORK SEPARATION ENVIRONMENT

(71) Applicant: Korea Electric Power Corporation, Naju-si (KR)

(72) Inventors: Jong-Kwan Kim, Sejong-si (KR); Seung-Youn Lee, Daejeon (KR); Seung-Kwon Yang, Daejeon (KR); Myong-Soo Kim, Daejeon (KR); Dong-Wook Kim, Daejeon (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 0 days.

(21) Appl. No.: 16/090,157

(22) PCT Filed: Jul. 4, 2017

(86) PCT No.: PCT/KR2017/007112
§ 371 (c)(1),
(2) Date: Sep. 28, 2018

(87) PCT Pub. No.: WO2018/221783
PCT Pub. Date: Dec. 6, 2018

(65) Prior Publication Data
US 2021/0200871 A1     Jul. 1, 2021

(30) Foreign Application Priority Data

May 29, 2017  (KR) .................. 10-2017-0066254

(51) Int. Cl.
| | |
|---|---|
| *G06F 21/85* | (2013.01) |
| *G06F 13/38* | (2006.01) |
| *G06F 21/12* | (2013.01) |
| *G06F 21/56* | (2013.01) |
| *G06F 21/64* | (2013.01) |

(52) U.S. Cl.
CPC ............ *G06F 21/85* (2013.01); *G06F 13/382* (2013.01); *G06F 21/125* (2013.01);
(Continued)

(58) Field of Classification Search
CPC ........ G06F 21/85; G06F 21/562; G06F 21/64; G06F 21/125; G06F 21/566; G06F 13/382
See application file for complete search history.

(56) References Cited

U.S. PATENT DOCUMENTS 9,292,689 B1 *   3/2016   Chuo ................... G06F 21/565
9,928,386 B1 *   3/2018   Gardner ............... G06F 21/75
(Continued)

FOREIGN PATENT DOCUMENTS

KR      100829670 B1    5/2008
KR      100979100 B1    8/2010
(Continued)

OTHER PUBLICATIONS

Usbeck, K.; Gillen, M.; Loyall, J.; Gronosky, A.; Sterling, J.; Kohler, R.; Newkirk, R.; Canestrare, D.; "Data Ferrying to the Tactical Edge: A Field Experiment in Exchanging Mission Plans and Intelligence in Austere Environments", Military Communications Conference, IEEE, Oct. 6-8, 2014, pp. 1311-1317.*

*Primary Examiner* — Victor Lesniewski
(74) *Attorney, Agent, or Firm* — Foundation Law Group, LLP

(57) ABSTRACT

A data transmission system and method in a physical network separation environment is provided, which includes: a drive device controlling connection switching for one storage medium drive writing or reading a data file on or from a predetermined storage medium; a source-side server executing writing the data file on the storage medium loaded in the storage medium drive, after switching to a connection
(Continued)

to the storage medium drive; a clean PC conducting hash value verification and a test for infection of malicious code with respect to the data file that has been written on the storage medium, after switching to a connection to the storage medium drive; and a destination-side server executing reading the tested data file from the storage medium, after switching to a connection to the storage medium drive.

18 Claims, 11 Drawing Sheets

(52) U.S. Cl.
CPC .......... *G06F 21/562* (2013.01); *G06F 21/566* (2013.01); *G06F 21/64* (2013.01); *G06F 2213/0042* (2013.01)

(56) References Cited

U.S. PATENT DOCUMENTS

| | | | |
|---|---|---|---|
| 2003/0179659 A1* | 9/2003 | Shi | G06F 3/0635 361/112 |
| 2004/0081427 A1* | 4/2004 | Kwon | G11B 7/28 386/243 |
| 2006/0236393 A1* | 10/2006 | Kramer | G06F 21/564 726/23 |
| 2007/0192854 A1* | 8/2007 | Kelley | G06F 21/566 726/22 |
| 2008/0091861 A1* | 4/2008 | Jones | G06F 3/0659 710/106 |
| 2009/0259923 A1* | 10/2009 | Barthel | H04L 1/008 714/799 |
| 2011/0289548 A1* | 11/2011 | Heidenreich | G06F 21/85 726/1 |
| 2015/0350316 A1* | 12/2015 | Calder | H04L 63/0428 714/19 |
| 2017/0054682 A1* | 2/2017 | Froelich | H04L 63/02 |
| 2018/0121656 A1* | 5/2018 | Scherer, III | G06F 11/1469 |
| 2018/0213404 A1* | 7/2018 | Kim | G06F 21/82 |

FOREIGN PATENT DOCUMENTS

| | | |
|---|---|---|
| KR | 20140100452 A | 8/2014 |
| KR | 101489759 B1 | 2/2015 |
| KR | 20150091599 A | 8/2015 |
| KR | 101621361 B1 | 5/2016 |

* cited by examiner

DATA TRANSMISSION SYSTEM AND METHOD IN PHYSICAL NETWORK SEPARATION ENVIRONMENT

TECHNICAL FIELD

The present invention relates to a data transmission system and method in a physical network separation environment. More particularly, the present invention relates to a data transmission system and method in a physical network separation environment, the system and method enabling an optical disc drive in which an optical disc is loaded or a USB drive in which a USB storage medium is loaded to physically switch so as to transmit a data file between a source-side server, a clean PC, and a destination-side server in order, thereby automatically transmitting the data file in the physical network separation environment.

Also, the present invention relates to a data transmission system and method in a physical network separation environment, the system and method using an automatic optical disc transfer unit to physically transmit an optical disc in an optical disc drive connected to each of a source relay server, a clean PC, and a destination relay server, thereby automatically transmitting a data file in the physical network separation environment.

BACKGROUND ART

Currently, a critical information infrastructure is designated as an electronic control and management system related to national security, administration, national defense, public order, finance, communications, transportation, energy, etc. in accordance with an act protecting information and communications infrastructure. The critical information infrastructure establishes and implements measures for protection against electronic infringement such that facilities are operated in a stable manner to ensure the stability of the nation and people's lives.

Particularly, the core security guideline for the critical information infrastructure is separation of networks operated by each organization, and relates to network separation between an intranet and the Internet, and to network separation between the intranet and a critical information infrastructure network.

First, as technologies used in network separation between the intranet and the Internet, there are mainly three methods: server-based network separation, network separation through PC virtualization, and network separation through physical separation between a business PC and an Internet PC.

FIG. 1 is a diagram illustrating an example of server-based network separation between an intranet and the Internet.

However, some organizations have adopted one of the above-described three methods for operation even in network separation between the intranet and the critical information infrastructure network. Further, other organizations operate with physical network separation between the intranet and the critical information infrastructure network without employing all the above-described three methods in accordance with the importance of the facility and related security guidelines.

However, mostly, various systems operating in the intranet require data in real time which is generated in the critical information infrastructure network, and thus the data is received from the critical information infrastructure network to the intranet via a one-way data transmission device.

FIG. 2 is a diagram illustrating a data transmission system using a one-way data transmission device.

A one-way data transmission device 10 is capable of data transmission in a direction from the critical information infrastructure network to the intranet, and data transmission in the opposite direction is impossible. That is, the one-way data transmission device 10 is a network relay device in which a transmission line of the critical information infrastructure network is physically blocked in the intranet, and is developed according to the system characteristics of each organization and is in use.

However, when performing system management tasks such as building various databases, updating software, etc. of the critical information infrastructure, data stored in a general business system may be required. As described above, when it is necessary to transmit data from the intranet to the critical information infrastructure network, a method of transmitting the data using an optical disc has been used as shown in FIG. 3. FIG. 3 is a diagram illustrating an example of a process of transmitting data by using an optical disc.

That is, a manager copies data from a business system (a source server) to an auxiliary memory medium, such as a USB, etc. (①), and a test for malicious code is conducted in a clean PC which is not connected to any network (②). After, when there is no abnormality in the test for malicious code, the manager copies the data to optical discs (e.g., CDs, DVDs, etc.) and inputs the data directly to the server or PC of the critical information infrastructure using the optical discs (③) and (④).

Here, the optical disc is used because the use of the USB auxiliary memory medium is prohibited in information and communication facilities, such as all servers, PCs, etc., within the critical information infrastructure network according to security guidelines of the government supervision organization. There was a case where the USB auxiliary memory medium was used as a main transmission channel of Stuxnet malicious code, and thus the use there of is prohibited in most control networks.

As described above, the data transmission method using the optical disc to the critical information infrastructure network is a significantly inefficient method because it requires manual labor.

With the method, a considerable time gap occurs from the time when a need for transmitting data occurs until the time when the data is actually transmitted, and thus it is difficult to process tasks in real time. Also, it is difficult to track and manage the data input to the control network in the future. Thus, if a security incident occurs, it may be difficult to know the causes.

In the meantime, currently, the server-based network separation technology used in network separation between the Internet and the intranet of each organization such as a power company, etc. is prohibited to use in network separation between the intranet and critical information infrastructure such as a power control system according to security guidelines. In this case, only the one-way data transmission device is allowed to be used, which may have physical network separation effect. Accordingly, each organization uses the data transmission method mentioned in FIG. 3. That is, system managers directly transmit data files from the intranet to the critical information infrastructure network by using optical discs.

This method is a critical barrier to the function and performance improvement of the critical information infrastructure network, resulting in an increase in the risk of occurrence of the security incident and inefficiency in the related personnel operation.

Specifically, the detailed problems are as follows.

First, the critical information infrastructure, such as a current power control system, i.e. supervisory control and data acquisition (SCADA) has the capability to utilize advanced application technologies, such as improvement of operation situation recognition ability using data of a geographic information system, condition-based facility management operation, and customer service quality improvement using customer data of a customer information system in addition to simple monitoring and controlling functions, which may meet user needs.

In order to apply these technologies to the critical information infrastructure, real-time (within one minute, etc.) or similarly real-time (within one to 15 minutes, etc.) data connection is necessary between the critical information infrastructure and the system, such as the geographic information system, the customer information system, etc. in the intranet.

However, physical network separation between the critical information infrastructure network and the intranet causes a data transmission time to be longer. If a system management staff is absent, it becomes an operation environment where data transmission is impossible, and thus function expansion and maintenance of the critical information infrastructure may be impossible.

The physical network separation causes inefficiency in operation management of the critical information infrastructure installed nationwide and deteriorates the quality of the public service.

Second, the critical information infrastructure is built mostly nationwide due to the characteristics, and it may be necessary to receive data from the intranet during operation and maintenance such as updating the system program. Thus, when employing the method using the optical disc, data may not be received on time.

Here, administrators responsible for operating the critical information infrastructure system may create a secret communication line between the critical information infrastructure network and the intranet. Such a secret communication line may be exposed to cyber infringement even if it is configured temporarily.

Third, the manager of the critical information infrastructure, etc. may work very inefficiently. For example, in order to transmit one piece of file data, at least two workers, such as a critical information infrastructure manager, a business system manager, etc., are required. In the case of frequent data transmission for smooth operation of the critical information infrastructure system, two or more workers are required at all times.

Also, mostly, the business server, the critical information infrastructure, and the clean PC are located at different places for security. Since transfer of the optical disc is required for data transmission, additional workers may be required.

Fourth, the likelihood of human security incident increases during the data transmission process. Also, the location in which the critical information infrastructure is installed is a restricted area. Even for authorized persons, frequent access to the restricted area may result in an increase of factors in the occurrence of intentional or unintentional access security incidents.

Fifth, when transmitting the file by a human, it is difficult to track and manage the data input to the critical information infrastructure network in the future. When unintentional hacking incidents, etc. occur in the critical information infrastructure, it is required to track an input channel of the corresponding file. Currently, mostly, only the name of the received file is recorded and managed by hand. Therefore, when hacking incidents occur, it is nearly impossible to analyze the causing file, and it takes considerable time.

Therefore, it is necessary to quickly improve the data transmission method using the optical disc by the system manager to improve the performance and function of the critical information infrastructure, to improve the work efficiency of the system manager, and to enhance system security.

Disclosure

Technical Problem

The present invention is intended to provide a data transmission system and method in a physical network separation environment, the system and method enabling an optical disc drive in which an optical disc is loaded or a USB drive in which a USB storage medium is loaded to physically switch so as to transmit a data file between a source-side server, a clean PC, and a destination-side server in order, thereby automatically transmitting the data file in the physical network separation environment.

Also, the present invention is intended to provide a data transmission system and method in a physical network separation, the system and method using an automatic optical disc transfer unit to physically move an optical disc in an optical disc drive directly connected to each of environment a source relay server, a clean PC, and a destination relay server, thereby automatically transmitting a data file in the physical network separation environment.

Technical Solution

According to an embodiment of the present invention, there is provided a data transmission system in a physical network separation environment, the system including: a drive device controlling connection switching for one storage medium drive writing or reading a data file on or from a predetermined storage medium; a source-side server executing writing the data file on the storage medium loaded in the storage medium drive, after switching to a connection to the storage medium drive; a clean PC conducting hash value verification and a test for infection of malicious code with respect to the data file that has been written on the storage medium, after switching to a connection to the storage medium drive; and a destination-side server executing reading the tested data file from the storage medium, after switching to a connection to the storage medium drive.

According to another embodiment of the present invention, there is provided a data transmission system in a physical network separation environment, the system including: a drive device physically moving a predetermined storage medium for first to third storage medium drives writing or reading a data file on or from a predetermined storage medium; a source-side server executing writing the data file on the storage medium loaded in the first storage medium drive; a clean PC conducting hash value verification and a test for infection of malicious code with respect to the data file that has been written on the storage medium loaded in the second storage medium drive; and a destination-side server executing reading the tested data file from the storage medium loaded in the third storage medium drive.

The storage medium may be an optical disc or a USB memory.

The drive device may be configured to load the storage medium in the storage medium drive in response to a request from the source-side server, before the source-side server executes writing the data file on the storage medium, and unload the storage medium from the storage medium drive in response to a request from destination-side server, after the destination-side server executes reading the data file from the storage medium.

Multiple drive devices may be configured in parallel.

The source-side server may include: a source server generating the data file to be transmitted to the destination-side server, and a source relay server executing writing the data file on the storage medium loaded in the storage medium drive by requesting the drive device to control the connection switching depending on a result of the test with respect to the data file received from the source server.

The destination-side server may include: a destination relay server executing reading the tested data file from the storage medium to conduct the hash value verification and the test for infection of malicious code; and a destination server receiving the data file from the destination relay server depending on a result of the test conducted by the destination relay server so as to perform a desired operation.

A one-way data transmission device may be provided between the source-side server and the destination-side server, and may be capable of data transmission only in a direction from the source-side server to the destination-side server.

The storage medium between the source-side server and the clean PC may be a USB memory, and the storage medium between the clean PC and the destination-side server may be an optical disc.

The drive device may include: the storage medium drive; a drive switching unit switching connections between the storage medium drive and one of the source-side servers, the clean PC, and the destination-side server; and a drive controller controlling a connection switching operation of the drive switching unit in connection with one of the source-side servers, the clean PC, and the destination-side server.

When the storage medium is an optical disc, the drive device may further include: an automatic optical disc supply unit automatically loading the optical disc in the storage medium drive; and an automatic optical disc holding unit automatically unloading the optical disc from the storage medium drive and holding the optical disc therein.

The drive controller may include: a signal conversion part electrically separating a control signal transmitted from each of the source-side server, the clean PC, and the destination-side server, respectively, and outputting the separated control signal; and an input/output control part controlling the connection switching operation of the drive switching unit depending on the separated control signal output from the signal conversion part.

The drive switching unit may be provided with power and communication connection lines corresponding to transmission channels of the data file for the source-side server, the clean PC, and the destination-side server, and the signal conversion part may be provided with a control line corresponding to a channel of the control signal for the source-side server, the clean PC, and the destination-side server.

The source-side server may be connected to the first storage medium drive, the clean PC may be connected to the second storage medium drive, and the destination-side server may be connected to the third storage medium drive.

The drive device may include an automatic storage medium transfer unit physically moving the storage medium to the first to third storage medium drive.

When the storage medium is an optical disc, the data transmission system may further include: an automatic optical disc supply unit automatically loading the optical disc in the first storage medium drive; and an automatic optical disc holding unit automatically unloading the optical disc from the third storage medium drive and holding the optical disc therein.

According to an embodiment of the present invention, there is provided a data transmission method in a physical network separation environment, the method including: switching, by a drive device, to a connection between a source-side server and a storage medium drive while loading a storage medium in the storage medium drive; switching, by the drive device, to a connection between a clean PC and the storage medium drive after the source-side server completes writing a data file on the storage medium; switching, by the drive device, to connection between a destination-side server and the storage medium drive after the clean PC conducts hash value verification and a test for infection of malicious code with respect to the data file on the storage medium; and unloading, by the drive device, the storage medium from the storage medium drive after the destination-side server completes reading the data file from the storage medium.

According to another embodiment of the present invention, there is provided a data transmission method in a physical network separation environment, the method including: loading, by a drive device, a storage medium in a first storage medium drive directly connected to a source-side server; physically moving, by the drive device, the storage medium to a second storage medium drive directly connected to a clean PC after the source-side server completes writing a data file on the storage medium; physically moving, by the drive device, the storage medium to a third storage medium drive directly connected to a destination-side server after the clean PC conducts hash value verification and a test for infection of malicious code with respect to the data file on the storage medium; and unloading, by the drive device, the storage medium from the third storage medium drive after the destination-side server completes reading the data file from the storage medium.

Advantageous Effects

According to the present invention, the optical disc drive in which the optical disc is loaded or the USB drive in which the USB storage medium is loaded physically switches to transmit the data file between the source-side server, the clean PC, and the destination-side server in order, thereby automatically transmitting the data file in the physical network separation environment.

Also, according to the present invention, in the optical disc drive directly connected to each of the source relay server, the clean PC, and the destination relay server, the optical disc is physically moved using the automatic optical disc transfer unit, thereby automatically transmitting the data file in the physical network separation environment.

Also, according to the present invention, by improving the method of transmitting data performed by a human using a optical disc between the intranet and the critical information infrastructure network which are physically separated into an automated optical disc transmission method, it is possible to solve the problems, which occur in the conventional method, such as constraints on improvement of the function of the physically separated ICT system such as the critical information infrastructure network, etc., inefficiency in personnel operation, an increase in data transmission consumption time, and an increase in security threat.

Also, according to the present invention, it is possible to dramatically help improvement of functions of ICT facilities such as the critical information infrastructure, etc. present in the physically separated networks. That is, it was impossible to transmit data in the external network or it took a long time, and thus the improvement of the function was impossible. However, the proposed method enables data file transmission in similarly real time (within 15 minutes for 500 MByte data with a single device, and within several minutes with a parallel configuration). Accordingly, data connection, etc. with systems, such as the critical information infrastructure, the geographic information system, etc., installed in the intranet is possible in similarly real time, and substantial additional functions may be added.

Also, according to the present invention, substantial security vulnerabilities caused by data transmission performed by a human may be solved. First, it is possible to prevent a critical information infrastructure manager, etc. from having a temptation to build a secret communication channel to the intranet.

Also, according to the present invention, every file introduced into the critical information infrastructure network is stored such that if a security incident occurs in the future, tracking and managing is easy. Accordingly, the present invention may lower the intent to introduce malicious code into the critical information infrastructure network such that security of the critical information infrastructure may be enhanced.

Also, according to the present invention, the risk of human security incidents may also be reduced. By reducing the number of times that access to the restricted area which is the location of the critical information infrastructure, it is possible to reduce the occurrence of the potential human security incidents that may be caused by the human who accesses the restricted area.

Also, according to the present invention, data transmission which has been performed by a human is automated such that efficiency of management personnel operation may be dramatically enhanced.

Also, according to the present invention, by applying a method that makes data transmission between physically separated networks with different security levels easier, it is possible to significantly reduce workload, to enable system function enhancement to be easy, and to reduce the risk of the security compared with the conventional method by a human.

MODE FOR INVENTION

Figure 1:
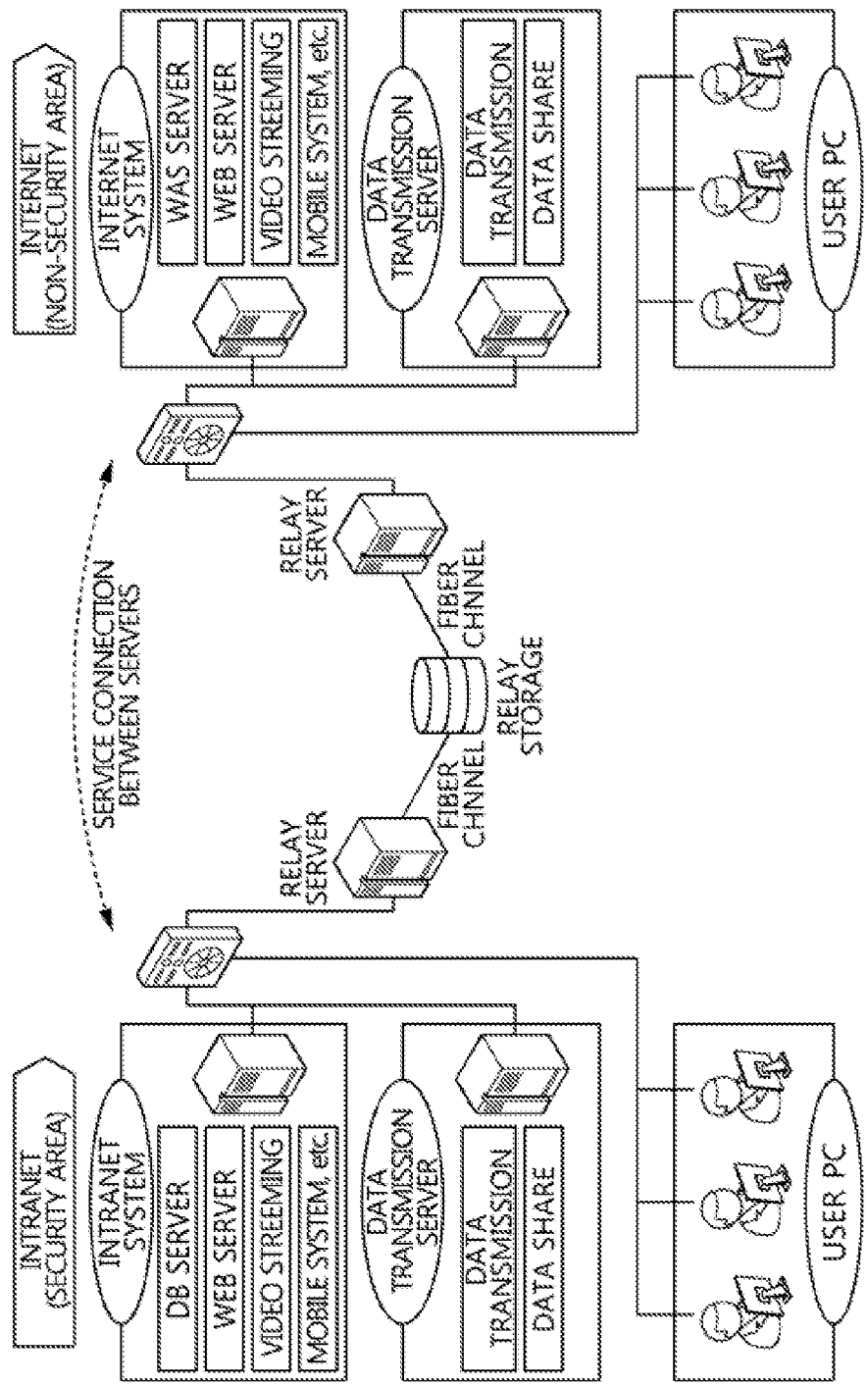
FIG. 1 is a diagram illustrating an example of server-based network separation between an intranet and the Internet.

Hereinbelow, a preferred embodiment of the present invention will be described in detail with reference to the accompanying drawings. However, it should be understood that the embodiment of the present invention may be changed to a variety of embodiments and the scope and spirit of the present invention are not limited to the embodiment described hereinbelow. The embodiment of the present invention described hereinbelow is provided for allowing those skilled in the art to more clearly comprehend the present invention. Therefore, it should be understood that the shape and size of the elements shown in the drawings may be exaggeratedly drawn to provide an easily understood description of the structure of the present invention. The same reference numerals refer to similar elements throughout. In the following description, it is to be noted that when the functions of conventional elements and the detailed description of elements related with the present invention may make the gist of the present invention unclear, a detailed description of those elements will be omitted.

In the present invention, data transmission methods using optical discs (e.g., CDs, DVDs, etc.) may apply in critical information infrastructure as follows.

First method is a multi-connected optical drive (MCOD) method by an optical drive controller (ODC), and a second method is an automatic moving optical drive (AMOD) method by an optical drive controller.

As additional methods, there are a multi-connected USB drive method and a multi-connected hybrid method which are modifications of the first method. Through these methods, data transmission may be automatically performed using the optical disc, FIG. 4 is a diagram illustrating a data transmission system in a physical network separation environment according to a first exemplary embodiment of the present invention.

Figure 4:
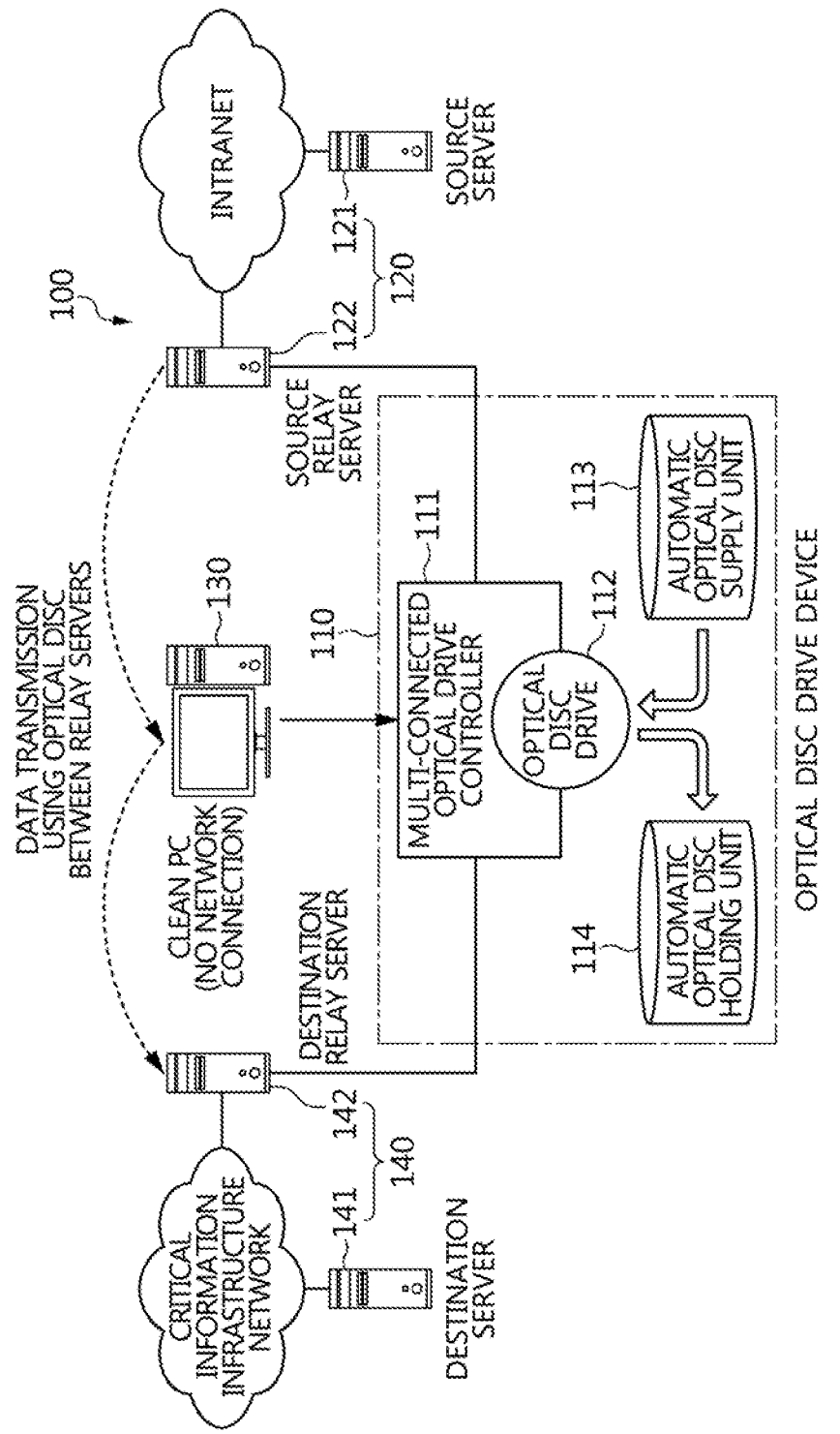
FIG. 4 is a diagram illustrating a data transmission system in a physical network separation environment according to a first exemplary embodiment of the present invention.

As shown in FIG. 4, the data transmission system (hereinafter, referred to as "a first data transmission system 100") in the physical network separation environment according to the first exemplary embodiment of the present invention implements the multi-connected optical drive (MCOD) method by the optical drive controller (ODC).

The first data transmission system 100 may include an optical disc drive device 110, a source-side server 120, a clean PC 130, and a destination-side server 140.

Figure 2:
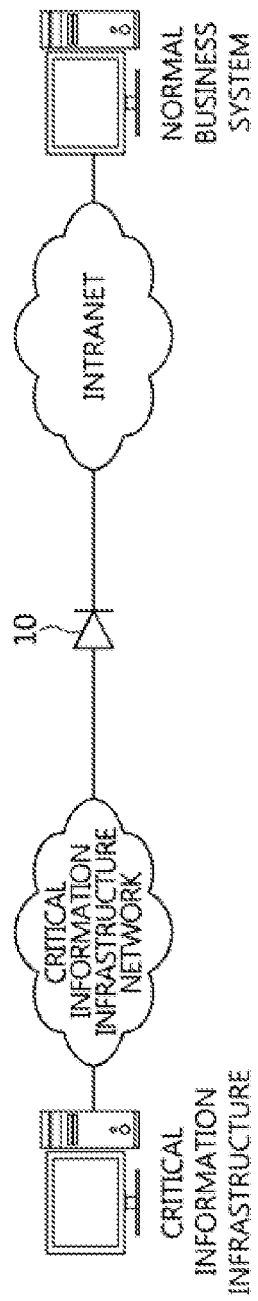
FIG. 2 is a diagram illustrating a data transmission system using a one-way data transmission device.
Figure 3:
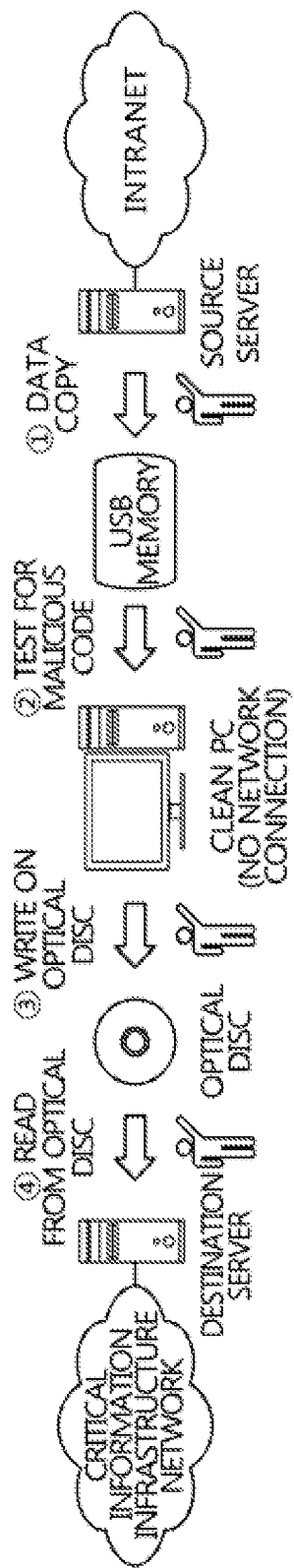
FIG. 3 is a diagram illustrating an example of a process of transmitting data by using an optical disc.

The optical disc drive device 110 includes a multi-connected optical drive controller 111 that controls physical switching with respect to power and communication connection lines between one optical disc drive 112 and each of the source-side server 120, the destination-side server 140, and the clean PC 130. The optical disc drive device 110 will be described with reference to FIG. 2.

Here, the source-side server 120 may be composed of at least one source server 121 connected to the intranet, and of one source relay server 122 which is responsible for a network relay function between the external network and the intranet. Similarly, the destination-side server 140 may be composed of at least one destination server 141 connected to the critical information infrastructure network, and of one destination relay server 142 which is responsible for a network relay function between the external network and the critical information infrastructure network.

Accordingly, the multi-connected optical drive controller 111 physically connects the optical disc drive 112 the source relay server 122 and via a connection line according to a control signal generated by the source server 121. Also, the multi-connected optical drive controller 111 physically connects the optical disc drive 112 and the destination relay server 142 via a connection line according to a control signal generated by the destination server 141.

Hereinafter, the roles and detailed functions of each component will be described as follows.

The source server 121 and the source relay server 122 are provided with an application installed therein for security in data file transmission, such that mutual authentication and encryption communication therebetween may be performed.

When a data file transmission request is received or periodic data file transmission is set, the source server 121 transmits a data file to the source relay server 122 through encryption communication. Here, the transmitted data file may include an IP address of the source server 121, an IP address of the destination server 141, requested data, an application program name, etc., and may also include a hash value of data for mutual authentication and encryption communication.

The source server 121 transmits the data file to the source relay server 122, stores the transmission time and the hash value of the data file, and waits for reception of a transmission completion message. That is, after data file transmission is completed, the source server 121 compares the hash value of the received transmission completion message and a pre-stored hash value to check that normal transmission of the file data is completed. Here, the transmission completion message is received from the destination-side server 140 via the one-way data transmission device.

In the meantime, the source server 121 may transmit a warning message to the source server manager when the transmission time of the data file exceeds or the hash value of the transmission completion message is different from the pre-stored hash value.

The source relay server 122 stores the data file received from the source server 121, and conducts hash value verification and a test for infection of malicious code. The source relay server 122 stores the data file in a long-term storage device (a hard disk, etc.).

The source relay server 122 transmits "a transmission preparation request control signal" to the multi-connected optical drive controller 111 when there is no abnormality in the result of the test, and transmits the warning message to the source server manager when there is abnormality in the result of the test.

When the source relay server 122 receives a preparation signal of the optical disc drive 112 from the multi-connected optical drive controller 111, the source relay server executes data file writing on an optical disc, which is a storage medium, via the optical disc drive 112, and after writing is completed, a writing completion signal is transmitted to the multi-connected optical drive controller 111.

Figure 5:
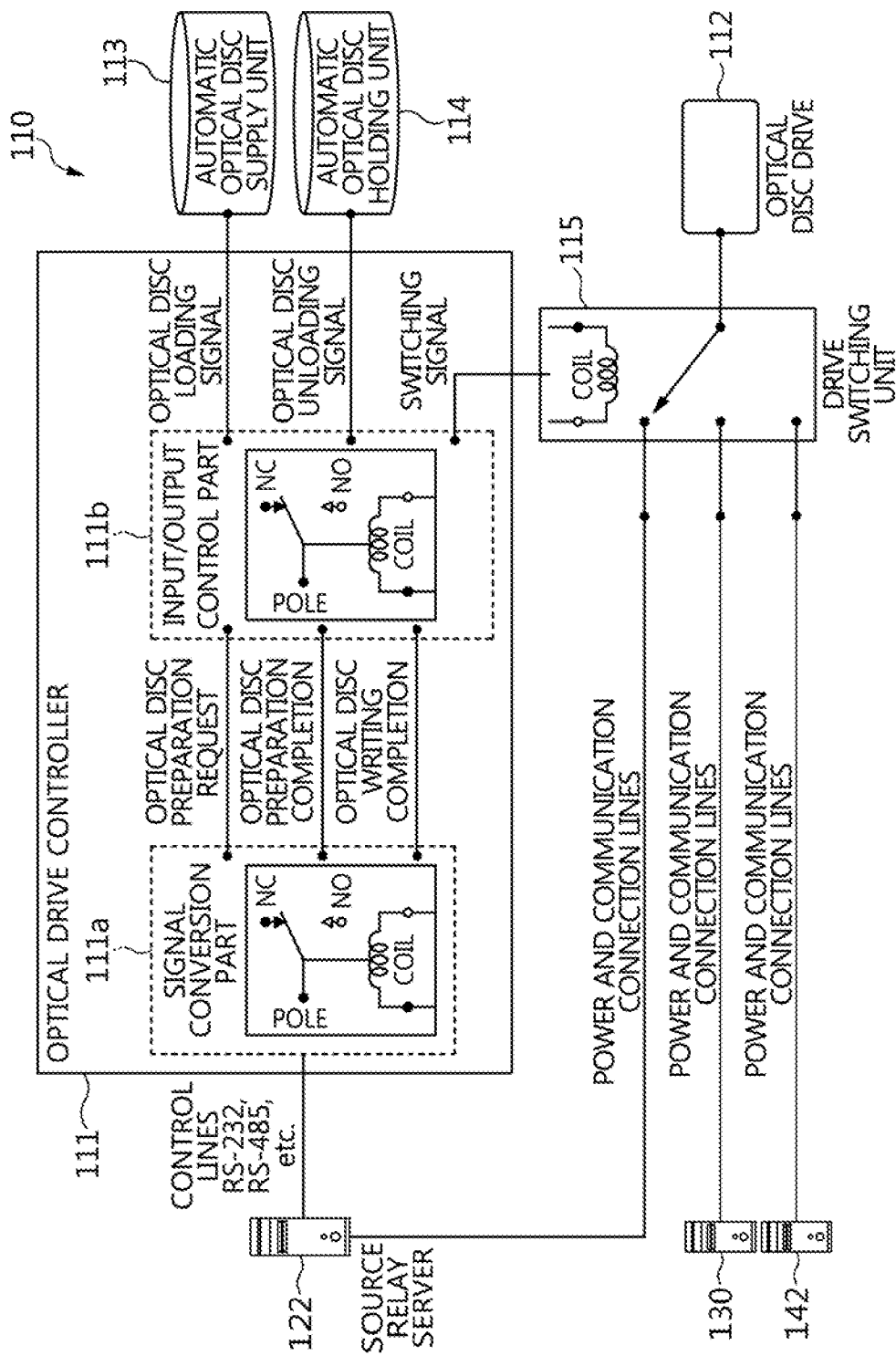
FIG. 5 is a diagram illustrating a configuration of the optical disc drive device of FIG. 4 in detail.

The optical disc drive device 110 will be described with reference to FIG. 5 as described above. FIG. 5 is a diagram illustrating a configuration of the optical disc drive device of FIG. 4 in detail.

The optical disc drive device 110 includes the multi-connected optical drive controller 111, the optical disc drive 112, an automatic optical disc supply unit 113, an automatic optical disc holding unit 114, and a drive switching unit 115.

Here, the drive switching unit 115 performs an operation of switching the connections between the optical disc drive 112 and one of the source-side servers 120, the clean PC 130, and the destination-side server 140. Further, the multi-connected optical drive controller III controls the operation of switching the connections performed by the drive switching unit 115 in connection with one of the source-side servers 120, the clean PC 130, and the destination-side server 140.

The multi-connected optical drive controller 111 receives the control signal from the source relay server 122, the clean PC 130, and the destination relay server 142 through the control line such as RS-232, RS-485, etc., separates the control signal into an electrical signal via a relay, and performs the subsequent step operation. This is to prevent cyber infringement that may happen in the case of connection with a LAN cable.

That is, simultaneously, the multi-connected optical drive controller 111 performs a process of switching power and communication connection lines to the optical disc drive 112 depending on the control signal transmitted from one of the source relay servers 122, the clean PC 130, the destination relay server 142, and controls a process of loading or unloading the optical disc into or from the optical disc drive 112.

Here, the optical disc drive 112 may perform writing or reading the data file on or from the optical disc.

Also, the multi-connected optical drive controller 111 contains a protection circuit that prevent the optical disc drive 112 from electrically switching connections from the source relay server 122 to the destination relay server 142.

Here, the multi-connected optical drive controller 111 includes a signal conversion part 111*a* and an input/output control part 111*b*.

Specifically, in order to prevent cyber infringement, the signal conversion part 111*a* separates the control signals transmitted from the source relay server 122, the clean PC 130, and the destination relay server 142 into electrical signals.

That is, the signal conversion part 111*a* receives each control signal via single control line (RS-232 or RS 485), electrically separates the control signal, and outputs the resulting signal. Here, an optical disc preparation request signal, an optical disc preparation completion signal, and an optical disc writing completion signal are output to different channels. Accordingly, it is possible that hacking attempts through the source relay server 122 are blocked.

The input/output control part 111*b* controls switching of connections between the optical disc drive 112 and one of the source relay servers 122, the clean PC 130, the destination relay server 142 depending on the control signal in order to transmit the data file, and depending thereon, loading or unloading of the optical disc in the optical disc drive 112 is controlled.

Here, FIG. 5 shows that the control line is connected only to the signal conversion part 111*a* and the source relay server 122, but is also connected to each of the signal conversion part 111*a*, the clean PC 130, and the destination relay server 142, and the connection is omitted in FIG. 5.

Also, the control line is a channel for the control signal, and the power and communication connection lines are channels for data file transmission.

Specifically, the signal conversion part 111*a* converts "the optical disc preparation request signal" transmitted from the source relay server 122 and transmits the result to the input/output control part 111*b*.

Here, the input/output control part 111*b* transmits "an optical disc loading signal" to the automatic optical disc supply unit 113, and the automatic optical disc supply unit 113 loads the optical disc in the optical disc drive 112.

Further, the input/output control part 111*b* transmits "a switching signal" to the drive switching unit 115, and the drive switching unit 115 connects the power and communication connection lines between the source relay server 122 and the optical disc drive 112.

After, the input/output control part 111*b* transmits "the optical disc preparation completion signal" to the signal conversion part 111*a* for conversion, so as to transmit the result to the source relay server 122. Here, the source relay server 122 executes data file writing on the optical disc loaded in the optical disc drive 112.

Next, the signal conversion part 111*a* converts "the writing completion signal" transmitted from the source relay server 122, and transmits the result to the input/output control part 111*b*.

The input/output control part 111*b* transmits "the switching signal" to the drive switching unit 111, and the drive switching unit 115 switches from the power and communication connection lines between the optical disc drive 112 and the source relay server 122 to the power and communication connection lines between the optical disc drive 112 and the clean PC 130.

After, the input/output control part 111*b* transmits "the optical disc preparation completion signal" to the signal conversion part 111*a* for conversion so as to transmit the result to the clean PC 130. Here, the clean PC 130 reads the data file from the optical disc loaded in the optical disc drive 112, and transmits the results of the hash value verification and the test for infection of malicious code (i.e., "an OK signal" or "a NOT OK signal") to the input/output control part 111*b* through the signal conversion part 111*a*.

First, when the input/output control part 111*b* receives "the OK signal" from the clean PC 130, the input/output control part transmits the switching signal to the drive switching unit 115. The drive switching unit 115 switches from connections of the power and communication connection lines between the optical disc drive 112 and the clean PC 130 so as to connect the power and communication connection lines between the optical disc drive 112 and the destination relay server 142.

After, the input/output control part 111*b* transmits "the optical disc preparation completion signal" to the signal conversion part 111*a* for conversion so as to transmit the result to the destination relay server 142. Here, the destination relay server 142 reads the data file from the optical disc loaded in the optical disc drive 112, and transmits the data file to the destination server 141 depending on the results of the hash value verification and the test for infection of malicious code. When the input/output control part 111*b* receives "an optical disc file reading completion signal" from the destination relay server 142 through the signal conversion part 111*a*, the input/output control part transmits "optical disc unloading signal" to the automatic optical disc holding unit 114. The automatic optical disc holding unit 114 unloads the optical disc from the optical disc drive 112 and automatically holds the optical disc therein.

When the input/output control part 111*b* receives the NOT OK signal from the destination relay server 142 through the signal conversion part 111*a* as the results of the hash value verification and the test for infection of malicious code, the input/output control part transmits "an optical disc unloading signal" to the automatic optical disc holding unit 114, and the automatic optical disc holding unit 114 unloads the optical disc from the optical disc drive 112 and automatically holds the optical disc therein. In this case, the input/output control part 111*b* generates a visible warning and an audible warning.

Similarly, when the input/output control part 111*b* receives "the NOT OK signal" from the clean PC 130, the input/output control part transmits "an optical disc unloading signal" to the automatic optical disc holding unit 114, and the automatic optical disc holding unit 114 unloads the optical disc from the optical disc drive 112 and automatically holds the optical disc therein. In this case, the input/output control part 111*b* generates a visible warning and an audible warning.

Here, the optical disc is automatically supplied to the automatic optical disc supply unit 113, and after reading, the optical disc is automatically held by the automatic optical disc holding unit 114 therein. The automatic optical disc holding unit 114 holds the optical discs by separating the optical discs that have passed the test from the optical discs that have failed the test.

When the clean PC 130 receives "the optical disc preparation completion signal" from the multi-connected optical drive controller 111, the clean PC reads the data file from the optical disc, and stores the data file. Here, the clean PC 130 stores the data file in the long-term storage device (a hard disk, etc.).

After, the clean PC 130 conducts hash value verification and the test for infection of malicious code with respect to the data file. That is, the clean PC 130 transmits a test pass signal (OK signal) to the multi-connected optical drive controller 111 when there is no abnormality. The clean PC 130 transmits a test fail signal (NOT OK signal) to the multi-connected optical drive controller 111 when there is abnormality.

When the destination relay server 142 receives "the optical disc preparation completion signal" from the multi-connected optical drive controller 111, the destination relay server reads the data file from the optical disc loaded in the optical disc drive 112 and stores the data file. Here, the destination relay server 142 stores the data file in the long-term storage device (a hard disk, etc.).

After, the destination relay server 142 conducts hash value verification and the test for infection of malicious code with respect to the data file. That is, when there is no abnormality, the destination relay server 142 transmits the data file to the destination server 141 while transmitting the test pass signal (OK signal) to the multi-connected optical drive controller 111. When there is abnormality, the destination relay server 142 transmits the test fail signal to the source relay server 122 via the one-way data transmission device while transmitting the test fail signal (NOT OK signal) to the multi-connected optical drive controller 111.

When the destination server 141 receives the data file from the destination relay server 142, the destination server conducts hash value verification and the test for infection of malicious code with respect to the data file.

That is, when there is no abnormality, the destination server 141 transmits the test pass signal to the source relay server 122 via the one-way data transmission device while performing a desired operation using the data file.

When there is abnormality, the destination server 141 stops the desired operation while transmitting the test fail signal to the source relay server 122 via the one-way data transmission device. Here, the one-way data transmission device will be described with reference to FIG. 11 later.

Figure 6:
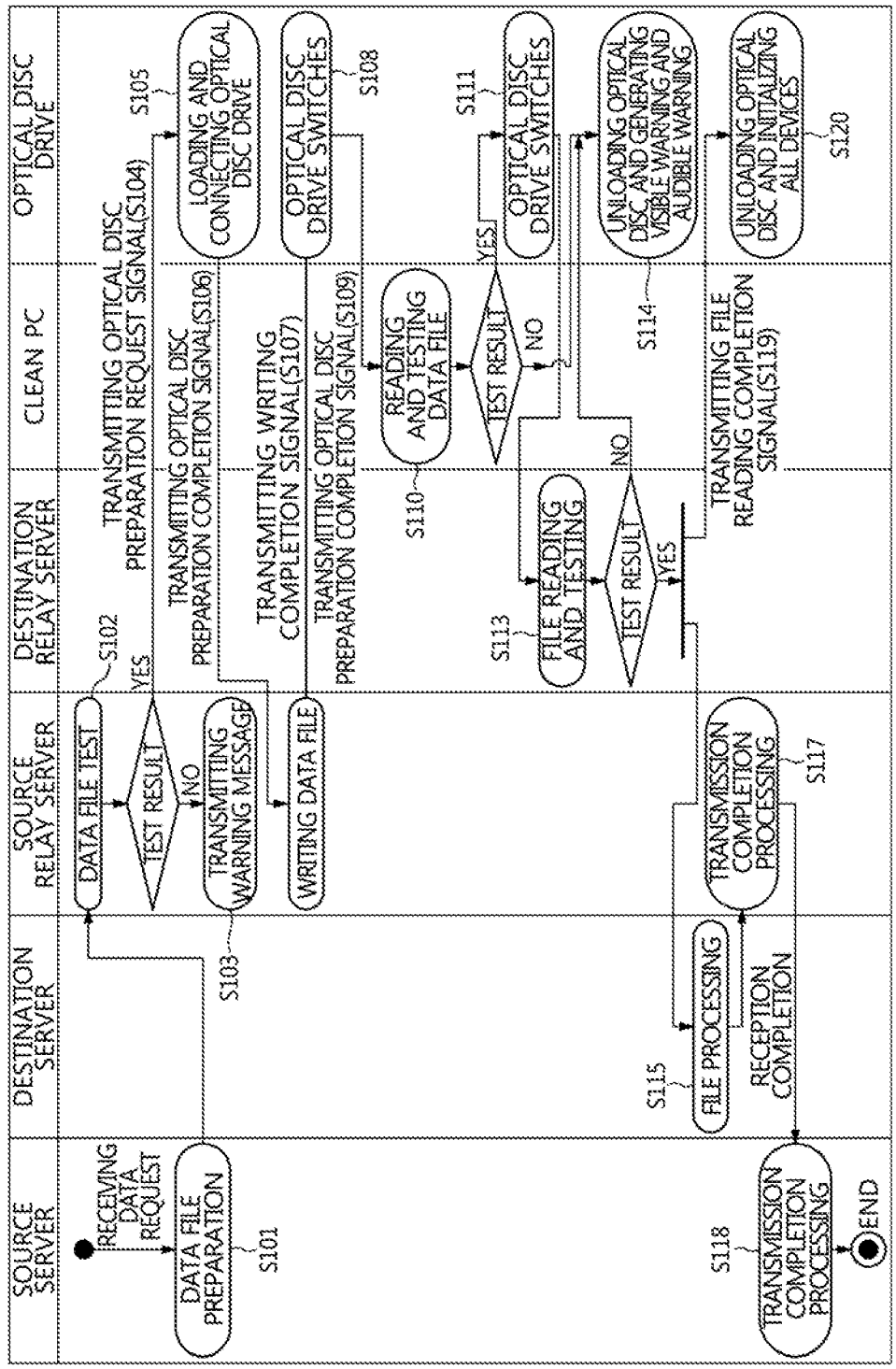
FIG. 6 is a diagram illustrating a data transmission method in a physical network separation environment by using an optical disc according to the first exemplary embodiment of the present invention.

FIG. 6 is a diagram illustrating a data transmission method in a physical network separation environment according to the first exemplary embodiment of the present invention.

FIG. 6 shows a process of transmitting a data file from the source server 121 to the destination server 141.

First, when there is a command of the server manager or when a data transmission request message is received from the destination server 141 via the one-way data transmission device, the source server 121 starts data file transmission preparation at step S101. Here, the source server 121 generates a data file to be transmitted. The data file may consist of the IP address of the source server 121, the IP address of the destination server 141, the requested data, and a hash value of the IP address and the data.

Next, the source relay server 122 tests the data file received from the source server 121 at step S102. First, mutual authentication and encryption communication (Secure Socket Layer (SSL), etc.) are performed between the source server 121 and the source relay server 122 such that an unauthorized server is prevented from accessing the source server 121. Also, the source relay server 122 conducts hash value verification and the test for infection of malicious code with respect to the data file transmitted from the source server 121, and stores the data file.

When there is abnormality, the source relay server 122 transmits the warning message to the server manager at step S103. However, when there is no abnormality, the source relay server 122 transmits "the optical disc preparation request signal" to the multi-connected optical drive controller 111 at step S104. Here, "the optical disc preparation request signal" is a signal indicating that data file transmission preparation has completed.

The multi-connected optical drive controller 111 loads the optical disc in the optical disc drive 112, and connects the power and communication connection lines between the optical disc drive 112 and the source server 121 at step S105. Here, the multi-connected optical drive controller 111 transmits "the optical disc preparation completion signal" to the source relay server 122 at step S106.

The source relay server 122 is connected to the optical disc drive 112, and when data file writing on the optical disc is completed, the source relay server transmits "the writing completion signal" to the multi-connected optical drive controller 111 at step S107.

Next, the multi-connected optical drive controller 111 switches from the connection between the optical disc drive 112 and the source server 121 to the connection between the optical disc drive 112 and the clean PC 130 at step S108. Here, the multi-connected optical drive controller 111 transmits "the optical disc preparation completion signal" to the clean PC 130 at step S109.

The clean PC 130 reads the data file recorded on the optical disc loaded in the optical disc drive 112, conducts hash value verification and the test for infection of malicious code with respect to the data file, and stores the data file at step S110.

That is, the clean PC 130 transmits the test pass signal (OK signal) or the test fail signal (NOT OK signal) to the multi-connected optical drive controller 111 depending on the result of the test at step S111 or S112.

First, when the multi-connected optical drive controller 111 receives the test pass signal (OK signal) from the clean PC 130, the multi-connected optical drive controller switches from the connection between the optical disc drive 112 and the clean PC 130 to the connection between the optical disc drive 112 and the destination relay server 142 at step S111. Here, the multi-connected optical drive controller 111 transmits "the optical disc preparation completion signal" to the destination relay server 142 at step S112.

Next, when the multi-connected optical drive controller 111 receives the test fail signal (NOT OK signal) from the clean PC 130, the optical disc is unloaded from the optical disc drive 112 and is automatically held, and the visible warning and the audible warning are generated at step S114.

In the meantime, when the destination relay server 142 receives "the optical disc preparation completion signal" from the multi-connected optical drive controller 111 at step S112, the destination relay server reads the data file recorded on the optical disc and conducts hash value verification and the test for infection of malicious code with respect to the data file at step S113. Here, when the multi-connected optical drive controller 111 receives the test fail signal (NOT OK signal) from the destination relay server 142, the above-described step S114 is performed. Here, the destination relay server 142 stops a desired operation while transmitting the test fail signal to the source relay server 122 via the one-way data transmission device.

When there is no abnormality, the destination relay server 142 transmits the data file to the destination server 141, and the destination server 141 performs a desired operation using the data received from the destination relay server 142 at step S115.

Also, when transmission of the data file from the destination relay server 142 is completed, the destination server 141 transmits "a reception completion signal" to the source relay server 122 via the one-way data transmission device at step S116. After, the source relay server 122 and the source server 121 perform transmission completion processing with respect to the data file at step S117 and S118.

Also, when transmission of the data file to the destination server 141 is completed, the destination relay server 142 transmits "a file reading completion signal" to the multi-connected optical drive controller 111 at step S19. Here, the multi-connected optical drive controller 111 unloads the optical disc from the optical disc drive 112 and initializes all devices at step S120.

Figure 7:
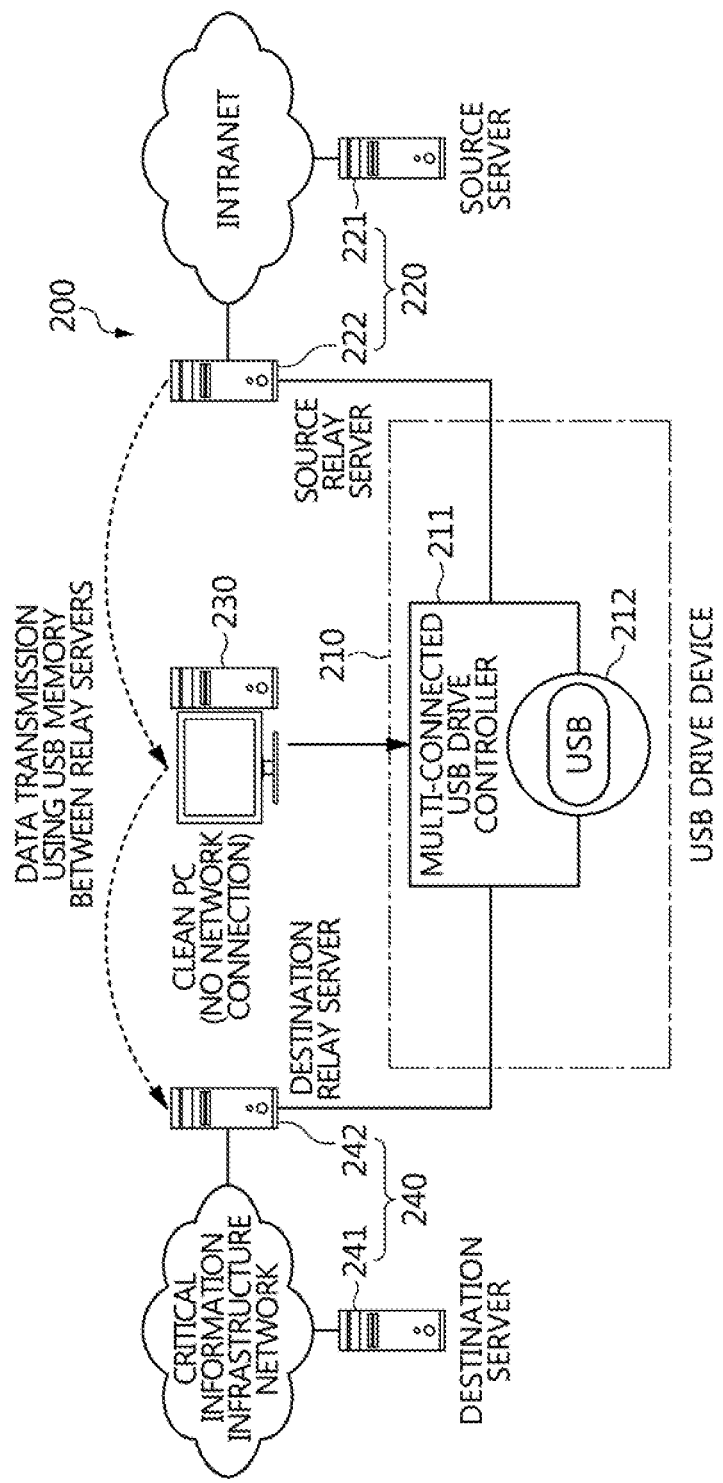
FIG. 7 is a diagram illustrating a data transmission system in a physical network separation environment according to a second exemplary embodiment of the present invention.

FIG. 7 is a diagram illustrating a data transmission system in a physical network separation environment according to a second exemplary embodiment of the present invention.

The first data transmission system 100 shown in FIG. 4 may operate by being modified depending on security level of the critical information infrastructure network.

As shown in FIG. 7, according to the second exemplary embodiment of the present invention, the data transmission system (hereinafter, referred to as "a second data transmission system 200") in the physical network separation environment employs a switching method of a USB drive 212 instead of a switching method of the optical disc drive 112 in FIG. 4. The USB drive 212 may write or read data files on or from a USB memory which is a storage medium.

The second data transmission system 200 may includes a USB drive device 210, a source-side server 220, a clean PC 230, and a destination-side server 240. Since components of the second data transmission system 200 correspond to components of the first data transmission system 100, the repeated description will be omitted.

Compared with the first data transmission system 100, the second data transmission system 200 takes less time to read and write the data file, and optical disc purchasing and managing costs are saved, and thus economic efficiency is relatively great. However, the second data transmission system 200 is relatively low in security stability compared with the first data transmission system 10. Therefore, this method may be employed in consideration of system operation purpose and security level of each organization or corporation.

In the optical disc drive device 110 of the first data transmission system 10), when the source relay server 122, the clean PC 130, and the destination relay server 142 transmit writing or reading completion signals to the multi-connected optical drive controller 111, the multi-connected optical drive controller 111 performs switching operation with respect to the optical disc drive 112.

In contrast, in the USB drive device 210 of the second data transmission system 200, when the source relay server 222, the clean PC 230, and the destination relay server 242 transmit writing or reading completion signals to a multi-connected USB drive controller 211, the multi-connected USB drive controller 211 performs switching operation with respect to the USB drive 212. The USB drive device 210 does not require the automatic optical disc supply unit 113 and the automatic optical disc holding unit 114.

Figure 8:
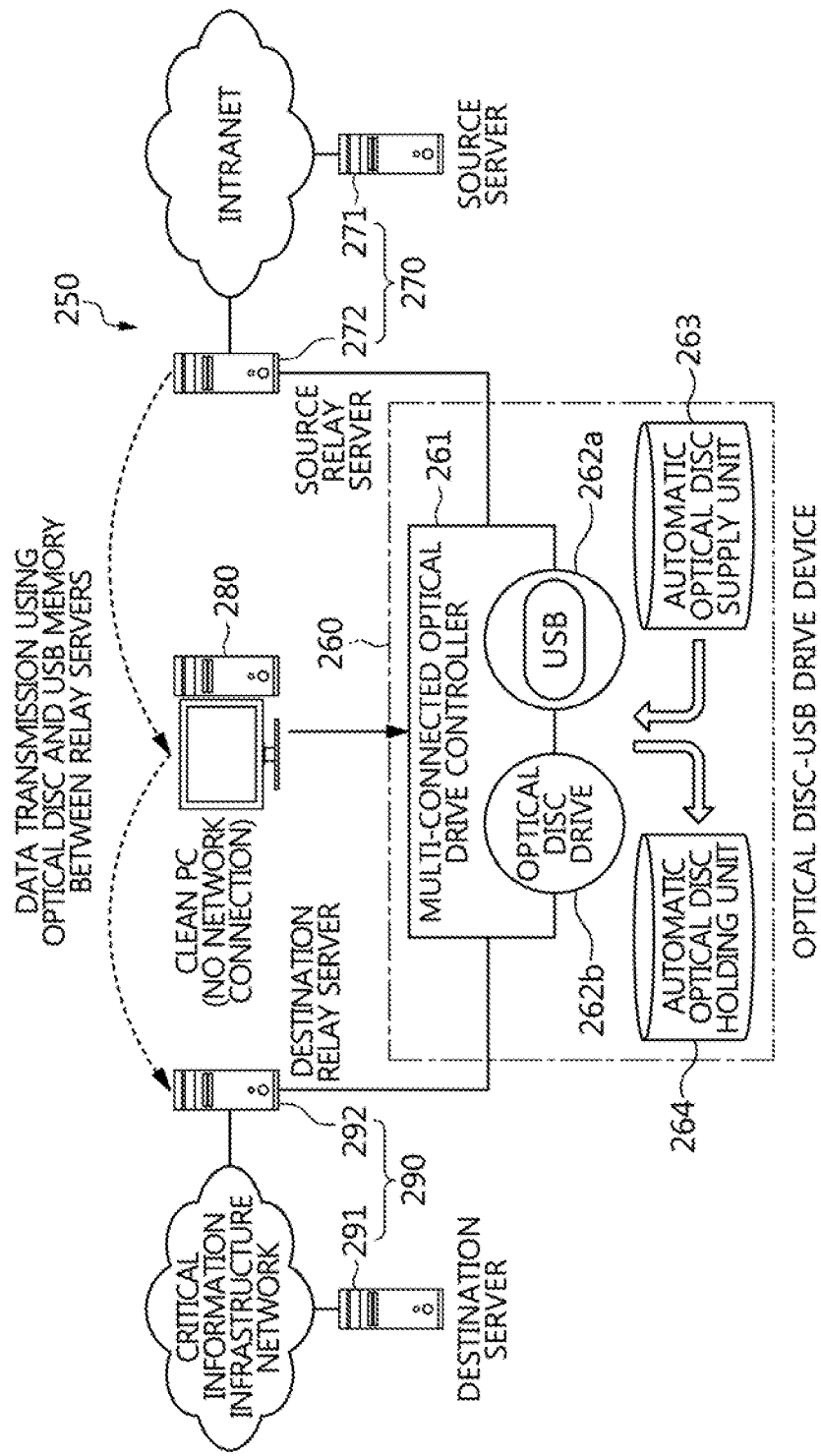
FIG. 8 is a diagram illustrating a data transmission system in a physical network separation environment according to a third exemplary embodiment of the present invention.

FIG. 8 is a diagram illustrating a data transmission system in a physical network separation environment according to a third exemplary embodiment of the present invention.

As shown in FIG. 8, according to the third exemplary embodiment of the present invention, the data transmission system (hereinafter, referred to as "a third data transmission system 250") in the physical network separation environment may operate modifying the first data transmission system 100 depending on security level of the critical information infrastructure network.

The third data transmission system 250, which is a multi-connected optical disc-USB hybrid method, employs a USB drive 252a between a source relay server 262 and a clean PC 270 and employs an optical disc drive 252b between the clean PC 270 and a destination relay server 282. That is, the third data transmission system 250 employs the USB drive 252a only between the source relay server 262 and the clean PC 270 instead of the optical disc drive, compared with the first data transmission system 100.

The third data transmission system 250 may include an optical disc-USB drive device 260, a source-side server 270, a clean PC 280, and a destination-side server 290. Since components of the third data transmission system 250 correspond to components of the first data transmission system 100, the repeated description will be omitted.

With main security of the first data transmission system 100 mostly remain, the third data transmission system 250 takes relatively less time to read and write the data file than the method employing the optical disc. The third data transmission system 250 is relatively low in security stability compared with the first data transmission system 100. The third data transmission system 250 may apply depending on system operation purpose and security level of each organization or corporation.

The third data transmission system 250 applies USB drive 262a using the USB memory between a source relay server 272 and the clean PC 280.

The third data transmission system 250 may reduce the time that it takes the source relay server 272 to write the data file and the time that is takes the clean PC 280 to read the data file compared with the first data transmission system 100. For example, the writing rate of a compact disc (CD) which is a representative optical disc is about 1.2 Mbps for 12× speed, but the writing rate of the USB memory is about 100 Mbps for version 3.0. That is, the time may be shortened by 80 times or more in the corresponding section.

In the meantime, the first to third data transmission systems 100, 200, and 250 according to the present invention are compared to each other with respect to data file transmission rate as in the following Table 1. In this case, except for the common operation part, transmission of the data file of 500 MB is assumed considering only different operation part.

TABLE 1

| Drive method | First data transmission system (based on optical disc) | Second data transmission system (based on USB) | Third data transmission system (based on hybrid) |
| --- | --- | --- | --- |
| Data file transmission time | About 441 seconds (about 7.4 minutes) | About 10 seconds (about 0.16 minute) | About 426 seconds (about 7.1 minute |

First, data file transmission time of the first data transmission system 100 may be expressed as the sum of the time required for the source relay server 122 to perform writing on the CD, the time required for the clean PC 130 to perform reading from the CD, and the time required for the destination server 141 to perform reading from the CD. Here, the time required for the source relay server 122 to perform writing on the CD (rate 1.2 Mbps for 12× speed) is 416 seconds (i.e., 500 Mbps/1.2 Mbps). The time required for the clean PC 130 to perform reading from the CD (rate 40 Mbps) is 12.5 seconds (i.e., 500 Mbps/40 Mbps). The time required for the destination server 141 to perform reading from the CD (rate 40 Mbps) is 12.5 seconds (i.e., 500 Mbps/40 Mbps).

Next, data file transmission time of the second data transmission system 200 may be expressed as the sum of the time required for the source relay server 222 to perform writing on the USB, the time required for the clean PC 230 to perform reading from the USB, and the time required for the destination server 241 to perform reading from the USB. Here, the time required for the source relay server 222 to perform writing on the USB (rate 100 Mbps) is 5 seconds (i.e., 500 Mbps/100 Mbps). The time required for the clean PC 230 to perform reading from the USB (rate 200 Mbps) is 2.5 seconds (i.e., 500 Mbps/200 Mbps). The time required for the destination server 241 to perform reading from the USB (rate 200 Mbps) is 2.5 seconds (i.e., 500 Mbps/200 Mbps).

Next, data file transmission time of the third data transmission system 250 may be represented by the sum of the time required for the source relay server 272 to perform writing on the USB, the time required for the clean PC 280 to perform reading from the USB, the time required for the clean PC 280 to perform writing on the CD, and the time required for the destination server 291 to perform reading from the CD. Here, the time required for the source relay server 272 to perform writing on the USB (rate 100 Mbps) is 5 seconds (i.e., 500 Mbps/100 Mbps). The time required for the clean PC 280 to perform reading from the USB (rate 200 Mbps) is 2.5 seconds (i.e., 500 Mbps/200 Mbps). The time required for the clean PC 280 to perform writing on the CD (rate 1.2 Mbps for 12× speed) is 416 seconds (i.e., 500 Mbps/1.2 Mbps). The time required for the destination server 241 to perform reading from the CD (rate 40 Mbps) is 12.5 seconds (i.e., 500 Mbps/40 Mbps).

In the meantime, the first to third data transmission systems 100, 200, and 250 according to the present invention are compared to each other with respect to advantages and disadvantages as shown in the following Table 2.

TABLE 2

| Drive method | First data transmission system (based on optical disc) | Second data transmission system (based on USB) | Third data transmission system (based on hybrid) |
|---|---|---|---|
| Transmission rate | Low | High | Moderate |
| Economic efficiency | Low | High | Moderate |
| Security | High | Low | Moderate |
| Operational convenience | Low | High | Moderate |

Figure 9:
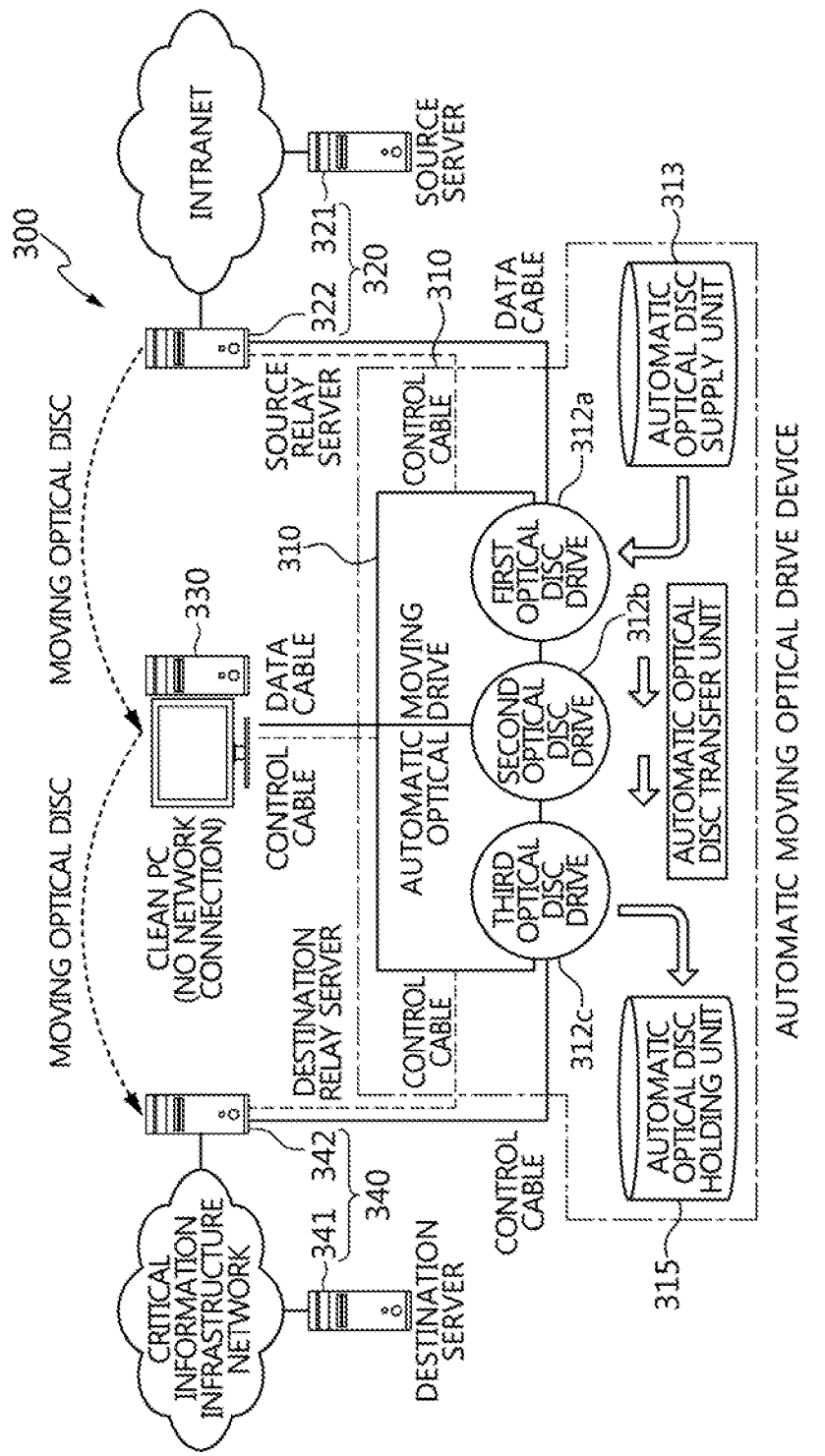
FIG. 9 is a diagram illustrating a data transmission system in a physical network separation environment according to a fourth exemplary embodiment of the present invention.

FIG. 9 is a diagram illustrating a data transmission system in a physical network separation environment according to a fourth exemplary embodiment of the present invention.

As shown in FIG. 9, according to the fourth exemplary embodiment of the present invention, the data transmission system (hereinafter, referred to as "a fourth data transmission system 300") in the physical network separation environment is a method of automatically moving the optical disc by connecting a source relay server 322, a clean PC 330, and a destination relay server 342 to first to third optical disc drives 312a to 312c, respectively, without using the switching method of the optical disc drive 112 in the first data transmission system 100. Here, the description has been made with respect to the optical disc, but it may also apply to a USB memory.

The fourth data transmission system 300 may minimize occurrence of electrical damage to server communication that may be caused by various surges which occur instantaneously due to switching operation in the first data transmission system 100.

The fourth data transmission system 300 may include an automatic moving optical drive device 310, a source-side server 320, the clean PC 330, and a destination-side server 340. Since components of the fourth data transmission system 300 correspond to components of the first data transmission system 100, the repeated description will be omitted.

The automatic moving optical drive device 310 directly connects first to third optical disc drives 312a to 312c to the source relay server 322, the clean PC 330, and the destination relay server 342, respectively. Here, the automatic moving optical drive device 310 controls physical movement of optical discs in the first to third optical disc drives 312a to 312c.

That is, when the automatic moving optical drive device 310 receives a writing or reading completion signal, the automatic moving optical drive device transfers the optical disc from the first optical disc drive 312a to the second optical disc drive 312b (namely, transfers the optical disc to the clean PC 330) and from the second optical disc drive 312b to the third optical disc drive 312c (namely, transfers the optical disc to the destination relay server 342) via an automatic optical disc transfer unit 314, or unloads the optical disc from the third optical disc drive 312c and holds the optical disc in an automatic optical disc holding unit 315.

This may be expressed as shown in the following Table 3.

TABLE 3

| Type | Generation signal | Optical disc drive device | Automatic moving optical drive device |
|---|---|---|---|
| Source relay server | Writing completion | Optical disc drive switches to connection to the clean PC | Physical transfer of the optical disc to the clean PC |
| Clean PC | Reading completion | Optical disc drive switches to connection to the destination relay server | Physical transfer of the optical disc to the destination relay-server |

Referring to operation order of the automatic moving optical drive device 310, when the source relay server 322 stores transmission file in the optical disc loaded in the first optical disc drive 312a and transmits a completion signal, the automatic moving optical drive device 310 physically moves the optical disc to the second optical disc drive 312b directly connected to the clean PC 330 by using the automatic optical disc transfer unit 314.

The clean PC 330 conducts hash value verification and test for malicious code with respect to the data file stored in the optical disc, and when the test fails, the clean PC generates a signal for holding the optical disc in the automatic optical disc holding unit 314 such that an undesired data file is blocked from moving between servers or PCs.

When the clean PC 330 completes the test of the data file, the automatic moving optical drive device 310 physically moves the optical disc to the third optical disc drive 312c directly connected to the destination relay server 342 by using the automatic optical disc transfer unit 314. Here, the automatic moving optical drive device 310 transmits a preparation completion signal to the destination relay server 342.

The destination relay server 342 reads the transmission file from the optical disc and conducts a test thereon, and when there is no abnormality, the destination relay server transmits the file to the destination server 141.

The automatic moving optical drive device 310 is similar to the optical disc drive device 110 in FIG. 4, but is different therefrom in that the optical disc is physically transferred rather that one optical disc drive 112 physically switches.

Figure 10:
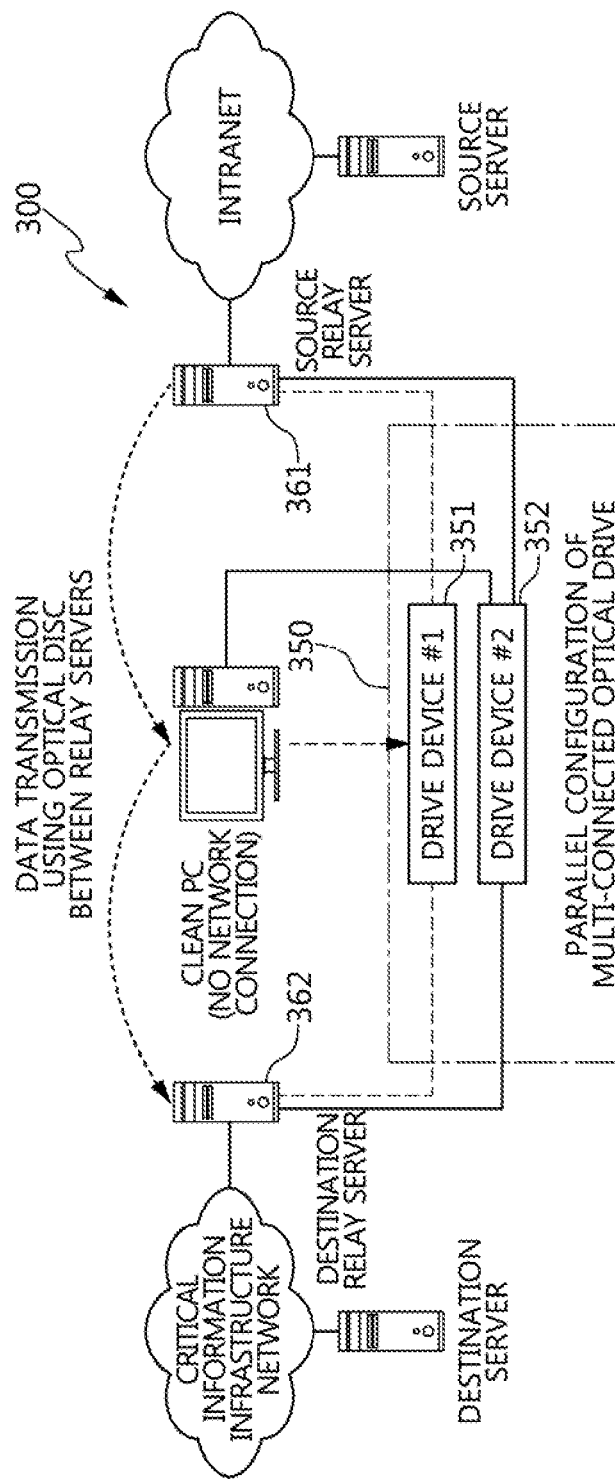
FIG. 10 is a diagram illustrating a parallel configuration of drive devices according to an embodiment of the present invention.

FIG. 10 is a diagram illustrating a parallel configuration of drive devices according to an embodiment of the present invention.

In FIG. 10, the drive devices of the first to fourth data transmission systems 100, 200, 250, and 300 may be configured in parallel.

That is, it is possible that the optical disc drive device 110 of the first data transmission system 100, the USB drive device 210 of the second data transmission system 200, the optical disc-USB drive device 260 of the third data transmission system 250, the automatic moving optical drive device 310 of the fourth data transmission system 300 are configured in parallel.

The parallel configuration may be used in the case where there is substantial data to be transmitted from the intranet to the critical information infrastructure network and the data is frequent and thus it is necessary to increase the transmission rate. That is, drive devices 351 and 352 are connected to each other in parallel between a source relay server 361 and a destination relay server 362 such that the transmission rate of the transmitted file may be increased.

Figure 11:
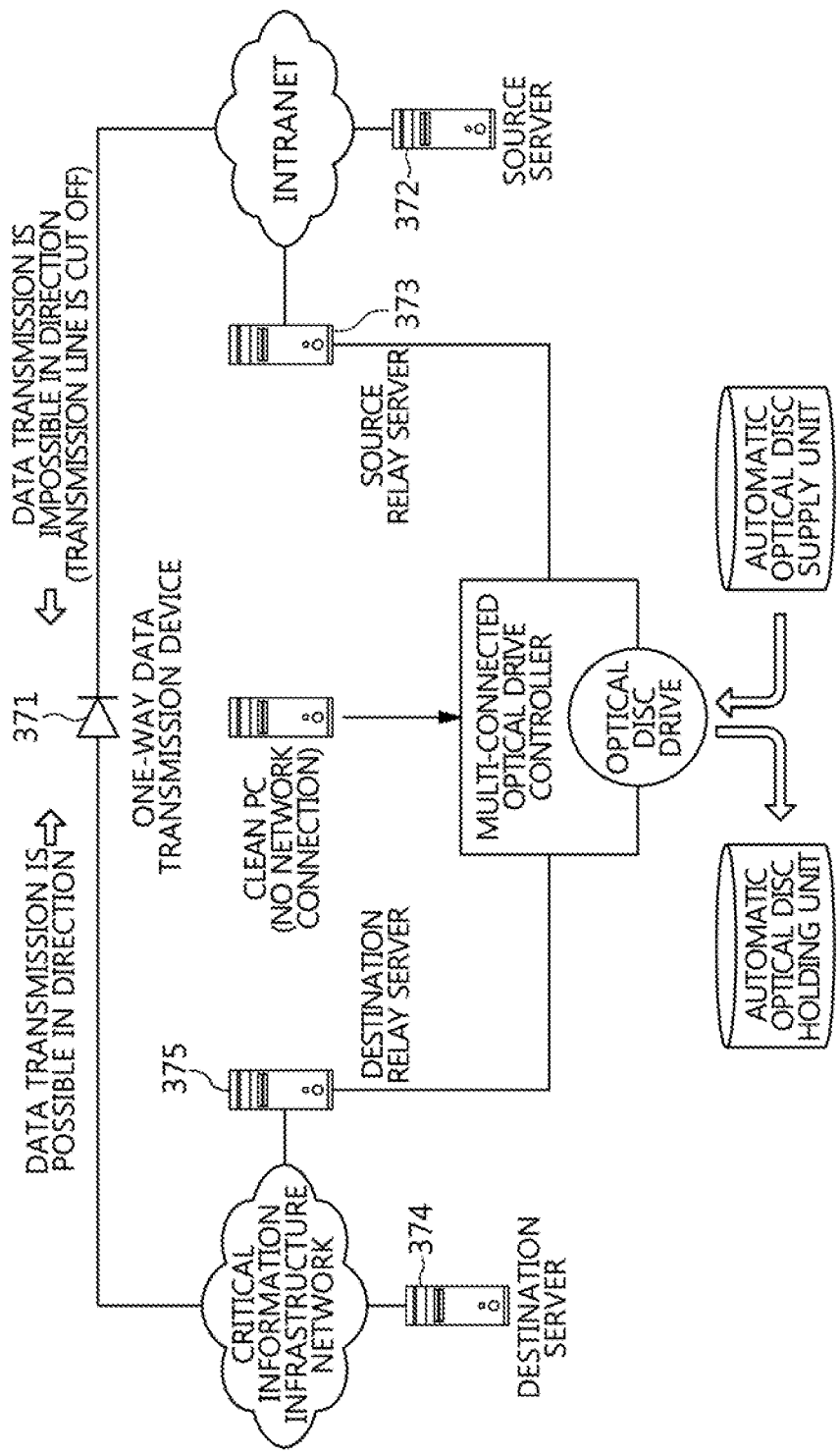
FIG. 11 is a diagram illustrating a one-way data transmission device applied to a first data transmission system in FIG. 4.

FIG. 11 is a diagram illustrating a one-way data transmission device applied to a first data transmission system in FIG. 4.

In FIG. 11, by using the one-way data transmission device 371 of the first data transmission system 100 in FIG. 4, whether data transmitted between physically separated networks is transmitted normally may be checked.

First, a source server 372 transmits a destination IP address, an application program identifier, a source IP address, an application program identifier, transmission data, and hash values thereof to a source relay server 373. The source relay server 373 waits to receive a hash value of reception completion transmitted from the destination server 374 via the one-way data transmission device 371, and when receiving the hash value, the source relay server compares hash values to check whether the transmission data is completed transmitted.

The destination server 374 receives the transmission data of the source server 372 via the destination relay server 375, compares the data and the hash value to determine whether there is abnormality, and then transmits the result thereof with the hash value to the source server 121 and the source relay server 122.

Although the preferred embodiment of the present invention has been disclosed for illustrative purposes, those skilled in the art will appreciate that various modifications, additions and substitutions are possible, without departing from the scope and spirit of the invention as disclosed in the accompanying claims. It is thus well known to those skilled in that art that the present invention is not limited to the embodiment disclosed in the detailed description, and the patent right of the present invention should be defined by the scope and spirit of the invention as disclosed in the accompanying claims. Accordingly, it should be understood that the present invention includes various modifications, additions and substitutions without departing from the scope and spirit of the invention as disclosed in the accompanying claims.

The invention claimed is:

1. A data transmission system in a physical network separation environment, the system comprising:
   a drive device controlling physical connection switching for one storage medium drive writing or reading a data file on or from a predetermined storage medium;
   a source-side server executing writing the data file on the storage medium loaded in the storage medium drive, after switching to a physical connection to the storage medium drive by the drive device, the source-side server connected to an external network;
   a clean PC conducting hash value verification and a test for infection of malicious code with respect to the data file that has been written on the storage medium, after switching to a physical connection to the storage medium drive from the source-side server by the drive device when the writing by the source-side server is completed, the clean PC having no network connection; and
   a destination-side server executing reading the tested data file from the storage medium and sending a signal to the drive device so that the predetermined storage medium is unloaded from the drive device when the reading is completed, after switching to a physical connection to the storage medium drive from the clean PC by the drive device and only when the hash value is verified and the data file passes the test, the destination-side server connected to a critical information infrastructure network,
   wherein the source-side server and the destination-side server have different security levels from each other.

2. The system of claim 1, wherein the storage medium between the source-side server and the clean PC is a USB memory, and
   the storage medium between the clean PC and the destination-side server is an optical disc.

3. The system of claim 1, wherein the drive device comprises:
   the storage medium drive;
   a drive switching unit switching connections between the storage medium drive and one of the source-side server, the clean PC, and the destination-side server; and
   a drive controller controlling a connection switching operation of the drive switching unit in connection with one of the source-side server, the clean PC, and the destination-side server.

4. The system of claim 3, wherein when the storage medium is an optical disc, the drive device further comprises:
   an automatic optical disc supply unit automatically loading the optical disc in the storage medium drive; and
   an automatic optical disc holding unit automatically unloading the optical disc from the storage medium drive and holding the optical disc therein.

5. The system of claim 3, wherein the drive controller comprises:
   a signal conversion part electrically separating a control signal transmitted from each of the source-side server, the clean PC, and the destination-side server, respectively, and outputting the separated control signal; and an input/output control part controlling the connection switching operation of the drive switching unit depending on the separated control signal output from the signal conversion part.

6. The system of claim 5, wherein the drive switching unit is provided with power and communication connection lines corresponding to transmission channels of the data file for the source-side server, the clean PC, and the destination-side server, and
the signal conversion part is provided with a control line corresponding to a channel of the control signal for the source-side server, the clean PC, and the destination-side server.

7. A data transmission system in a physical network separation environment, the system comprising:
a drive device physically moving a predetermined storage medium for first to third storage medium drives writing or reading a data file on or from the predetermined storage medium;
a source-side server executing writing the data file on the storage medium loaded in the first storage medium drive, after switching to a physical connection to the first storage medium drive by the drive device, the source-side server connected to an external network;
a clean PC conducting hash value verification and a test for infection of malicious code with respect to the data file that has been written on the storage medium loaded in the second storage medium drive, after switching to a physical connection to the second storage medium drive from the source-side server by the drive device when the writing by the source-side server is completed, the clean PC having no network connection; and
a destination-side server executing reading the tested data file from the storage medium loaded in the third storage medium drive and sending a signal to the drive device so that the predetermined storage medium is unloaded from the drive device when the reading is completed, after switching to a physical connection to the third storage medium drive from the clean PC by the drive device and only when the hash value is verified and the data file passes the test, the destination-side server connected to a critical information infrastructure network,
wherein the source-side server and the destination-side server have different security levels from each other.

8. The system of claim 7, wherein the storage medium is an optical disc or a USB memory.

9. The system of claim 7, wherein the drive device in configured to,
load the storage medium in the storage medium drive in response to a request from the source-side server, before the source-side server executes writing the data file on the storage medium, and
unload the storage medium from the storage medium drive in response to a request from destination-side server, after the destination-side server executes reading the data file from the storage medium.

10. The system of claim 7, wherein multiple drive devices are configured in parallel.

11. The system of claim 7, wherein the source-side server comprises:
a source server generating the data file to be transmitted to the destination-side server; and
a source relay server executing writing the data file on the storage medium loaded in the storage medium drive by requesting the drive device to control the connection switching depending on a result of the test with respect to the data file received from the source server.

12. The system of claim 7, wherein the destination-side server comprises:
a destination relay server executing reading the tested data file from the storage medium to conduct the hash value verification and the test for infection of malicious code; and
a destination server receiving the data file from the destination relay server depending on a result of the test conducted by the destination relay server so as to perform a desired operation.

13. The system of claim 7, wherein a one-way data transmission device is provided between the source-side server and the destination-side server, and is capable of data transmission only in a direction from the source-side server to the destination-side server.

14. The system of claim 7, wherein the source-side server is connected to the first storage medium drive, the clean PC is connected to the second storage medium drive, and the destination-side server is connected to the third storage medium drive.

15. The system of claim 7, wherein the drive device comprises:
an automatic storage medium transfer unit physically moving the storage medium to the first to third storage medium drive.

16. The system of claim 7, further comprising: when the storage medium is an optical disc,
an automatic optical disc supply unit automatically loading the optical disc in the first storage medium drive; and
an automatic optical disc holding unit automatically unloading the optical disc from the third storage medium drive and holding the optical disc therein.

17. A data transmission method in a physical network separation environment, the method comprising:
switching, by a drive device, to a physical connection between a source-side server and a storage medium drive while loading a storage medium in the storage medium drive, the source-side server connected to an external network;
switching, by the drive device, to a physical connection between a clean PC and the storage medium drive from the source-side server after the source-side server completes writing a data file on the storage medium, the clean PC having no network connection;
switching, by the drive device, to a physical connection between a destination-side server and the storage medium drive from the clean PC by the drive device after the clean PC conducts hash value verification and a test for infection of malicious code with respect to the data file on the storage medium when the writing by the source-side server is completed and only when the hash value is verified and the data file passes the test, the destination-side server connected to a critical information infrastructure network; and
unloading, by the drive device, the storage medium from the storage medium drive after sending a signal to the drive device so that the storage medium is unloaded from the drive device when the destination-side server completes reading the data file from the storage medium,
wherein the source-side server and the destination-side server have different security levels from each other.

18. A data transmission method in a physical network separation environment, the method comprising:

loading, by a drive device, a storage medium in a first storage medium drive directly and physically connected to a source-side server, the source-side server connected to an external network;

physically moving, by the drive device, the storage medium to a second storage medium drive directly and physically connected to a clean PC from the source-side server after the source-side server completes writing a data file on the storage medium, the clean PC having no network connection;

physically moving, by the drive device, the storage medium to a third storage medium drive directly and physically connected to a destination-side server from the clean PC by the drive device after the clean PC conducts hash value verification and a test for infection of malicious code with respect to the data file on the storage medium when the writing by the source-side server is completed and only when the hash value is verified and the data file passes the test, the destination-side server connected to a critical information infrastructure network; and unloading, by the drive device, the storage medium from the third storage medium drive after sending a signal to the drive device so that the storage medium is unloaded from the drive device when the destination-side server completes reading the data file from the storage medium, wherein the source-side server and the destination-side server have different security levels from each other.

* * * * *